US011677593B1

(12) United States Patent
Kumar et al.

(10) Patent No.: US 11,677,593 B1
(45) Date of Patent: Jun. 13, 2023

(54) SAMPLER WITH BUILT-IN DFE AND OFFSET CANCELLATION

(71) Applicant: Cadence Design Systems, Inc., San Jose, CA (US)

(72) Inventors: Vinod Kumar, Pratapgarh (IN); Thomas Evan Wilson, Laurel, MD (US)

(73) Assignee: Cadence Design Systems, Inc., San Jose, CA (US)

(*) Notice: Subject to any disclaimer, the term of this patent is extended or adjusted under 35 U.S.C. 154(b) by 0 days.

(21) Appl. No.: 17/752,829

(22) Filed: May 24, 2022

(51) Int. Cl.
*H04L 25/03* (2006.01)

(52) U.S. Cl.
CPC .............................. *H04L 25/03057* (2013.01)

(58) Field of Classification Search
CPC ......... H04L 25/03006; H04L 25/03057; H04L 25/0328; H04L 25/03885; H04L 25/03949; H04L 2025/03433; H04L 2025/0356
USPC ......... 375/232, 233, 348, 350; 708/322, 323
See application file for complete search history.

(56) References Cited

U.S. PATENT DOCUMENTS

| | | | |
|---|---|---|---|
| 11,323,117 B1* | 5/2022 | Tanguay | H03K 19/096 |
| 11,356,304 B1* | 6/2022 | Fortin | H04L 25/03949 |
| 2006/0227912 A1* | 10/2006 | Leibowitz | H04L 1/244 |
| | | | 375/350 |
| 2013/0257483 A1* | 10/2013 | Bulzacchelli | H03K 3/356139 |
| | | | 327/52 |
| 2013/0300482 A1* | 11/2013 | Abbasfar | H04L 25/497 |
| | | | 327/244 |
| 2016/0241421 A1* | 8/2016 | Lim | H04L 25/0272 |
| 2019/0273639 A1* | 9/2019 | Jose | H04L 25/0272 |

FOREIGN PATENT DOCUMENTS

KR       1802791 B1 * 11/2017 ....... H04L 25/03267

* cited by examiner

*Primary Examiner* — Young T. Tse
(74) *Attorney, Agent, or Firm* — Schwegman Lundberg & Woessner, P.A.

(57) ABSTRACT

Various embodiments provide for a data sampler with built-in decision feedback equalization (DFE) and offset cancellation. For some embodiments, two or more data samplers described herein can be used to implement a data signal receiver circuit, which can use those two or more data samplers to facilitate half-rate or quarter-rate data sampling.

20 Claims, 6 Drawing Sheets

SAMPLER WITH BUILT-IN DFE AND OFFSET CANCELLATION

TECHNICAL FIELD

Embodiments described herein relate to circuits and, more particularly, to a data sampler with built-in decision feedback equalization (DFE) and offset cancellation.

BACKGROUND

Data links (or TX/RX links) convey data over various media, such as a cable, a board trace, or backplane. Such a medium is often referred to as a channel. A channel can be imperfect and cause impairments on signals transmitted over the channel, such as attenuation, reflection, and noise (e.g., crosstalk). These impairments can lead to transmission errors. The quality of a channel can determine an upper limit on its achievable rate. Additionally, other impairments in a data link can degrade overall system performance. For instance, circuit non-idealities can also cause a degradation in a system's performance. Overall, minimizing impairments can enable a channel to reach or achieve higher data link rates.

BRIEF DESCRIPTION OF THE DRAWINGS

Various ones of the appended drawings merely illustrate example embodiments of the present disclosure and should not be considered as limiting its scope.

DETAILED DESCRIPTION

Various embodiments provide for a data sampler with built-in decision feedback equalization (DFE) and offset cancellation. For some embodiments, two or more data samplers described herein can be used to implement a data signal receiver circuit (hereafter, receiver circuit), which can use those two or more data samplers to facilitate half-rate or quarter-rate data sampling. Use of various embodiments can implement (or help in implementing) data sampling (e.g., half-rate or quarter rate data sampling) within a receiver circuit, which can receive data at a high data rate with equalization.

Traditionally, a data receiver comprises data comparators, clock comparators, and error comparators, each of which uses a circuit to sample a received data signal. Both data comparators and clock comparators can be used to quickly and reliably sample a received data signal. For example, a data comparator can sample the eye of a received data signal at its center and recover a data stream. As data rates increase between a data transmitter and a data receiver, bit duration (also referred to as a unit interval or UI) gets smaller; and smaller UIs reduce allowed timing errors within a data receiver. Higher data rates also mean that overall, a data receiver has to perform operations faster. Half-rate and quarter-rate data sampling (by a data sampler) can be used to reduce speed requirements of the clocking generation and distribution inside a receiver. For example, in a half-rate data receiver, two clock signals spaced 180° apart can be used, where each clock signal's rising edge causes sampling of one incoming bit from a received data signal. Usually, for a half-rate data receiver, twice as many clock signals running at half the line rate speed are required. A half-rate data receiver can be used for high-rate data links, such as those operating at 16 Gbps.

Conventional data receivers are known to use a Decision Feedback Equalizer (DFE) (which is a non-linear equalizer) to equalize the channel losses by compensating for inter-symbol interference (ISI) present within a received data signal (e.g., received from a data transmitter). Specifically, a DFE can use a data sampler to determine (e.g., make a decision on) a value of an incoming bit of a received data signal (e.g., thereby quantizing the received data signal) for a current UI, can obtain a value of a preceding bit (e.g., value of bit from one UI before) via a first tap of the DFE, can scale the value of the preceding bit by a coefficient (e.g., tap weight) associated with the first tap, and can apply the scaled value to a next incoming bit of the received signal by adding the scaled value to, or subtracting, the scaled value from the received signal via an analog summer. Generally, where only DFE-based equalization is used at a data receiver, the one or more tap weights (associated with the different taps) of the DFE would equal the non-equalized channel pulse response values for the incoming data signal (e.g., [a1, a2, . . . an]). The timing of a DFE loop can limit the speed of a receiver circuit (e.g., value of preceding needs to be determined in time prior to the next data bit being received).

A receiver circuit usually includes a pre-amplifier to increase signal sensitivity (e.g., improving the ability detect data from a small signal), and a DFE is usually implemented at the pre-amplifier stage of the receiver circuit. For instance, a conventional receiver circuit with a one-tap rolled DFE can use two pre-amplifiers, and a conventional receiver circuit with a one-tap un-rolled DFE can use two pre-amplifiers and two voltage generating circuits.

Unfortunately, use of a pre-amplifier not only results in extra hardware in the receiver circuit, but also increases power consumption of the receiver circuit and takes more area of circuit area (e.g., silicon wafer area). Use of a pre-amplifier can limit the data rate of a receiver circuit. Additionally, operation of a pre-amplifier can be strongly dependent on process, voltage, and temperature (PVT) and, as such, the pre-amplifier can consume the timing margin of a receiver circuit due to PVT variation. As a result, traditional use of a DFE with a pre-amplifier stage is not practical or useful with certain communication interfaces that occupy a small circuit area and are power efficient, such as high bandwidth interface (HBI) and die-to-die (D2D) interfaces. For instance, an HBI interface can provide ultra-low power, wide frequency range, chip-to-chip communication (e.g., 16Gbs and possibly higher on a communication channel). However, a conventional receiver architecture with one-tap DFE is not usable with an HBI interface because the conventional receiver architecture with one-tap DFE consumes more circuit area and is more power hungry than the HBI interface.

Various embodiments described herein provide for a data sampler with built-in DFE and offset cancellation of the data sampler, where the data sampler can be used for data sampling (e.g., half-rate data sampling) within a receiver circuit. Compared to conventional technologies, some embodiments described herein enable implementation of DFE, offset cancellation of the data sampler, or both within a receiver circuit of a communication interface while with less amount of circuit area and a lower amount of power consumption. For instance, an embodiment can enable practical implementation of DFE (e.g., one-tap DFE) within an HBI interface while retaining one or more technical features (e.g., advantages) of HBI interfaces (e.g., low power usage and small circuit area). For some embodiments, a receiver circuit that uses one or more data samplers described herein can obviate the need to include or use a pre-amplifier on an input signal (e.g., received circuit) prior to the input signal being sampled by the one or more data samplers. Some embodiments comprise a receiver circuit that includes at least two data samplers with built-in DFE and error cancellation as described herein, where a first data sampler is operating on a first clock signal (e.g., clock 0, CLK0) and a second data sampler is operating on a second clock signal (e.g., clock 180, CLK180) that compliments the first clock signal. The receiver circuit can be a half-rate receiver, and implement one-tap rolled DFE, where the output of the first data sampler is given as a decision feedback signal (e.g., DFE feedback signal) to the second data sampler, and the output of the second data sampler is given as a decision feedback signal (e.g., DFE feedback signal) to the first data sampler. Such an embodiment can, for example, detect a signal up to +/−25 mV across a reference voltage. Additionally, for some embodiment, when a coefficient (e.g., DFE coefficient) is determined for a built-in DFE of a data sampler (e.g., during DFE training process of the receiver circuit), the coefficient is determined such that the coefficient (once applied) would apply DFE, and cancel offset within the data sampler.

Some embodiments described herein enable implementation of a high-speed receiver architecture that can be power efficient, circuit area (e.g., silicon area) efficient, or both. The receiver architecture, provided by some embodiments, comprises a direct sampler architecture that can implement one-tap rolled analog DFE, provide per bit DFE training, provide per bit offset cancellation, or some combination thereof.

As used herein, a tap coefficient with a first polarity (e.g., +H) can comprise a positive or a negative value, and the (same) tap coefficient with a second polarity (e.g., −H) can comprise a positive value or negative value. For some embodiments, a tap coefficient with a first polarity and the tap coefficient with a second polarity are such that the first and second polarities are opposite polarities. For instance, for some embodiments, a first-tap coefficient (e.g., H1) with a first polarity (e.g., +H1) and the first-tap coefficient (e.g., H1) with a second polarity (e.g., −H1) are complementary values, where the two coefficients have the same absolute value but complementary polarity.

Reference will now be made in detail to embodiments of the present disclosure, examples of which are illustrated in the appended drawings. The present disclosure may, however, be embodied in many different forms and should not be construed as being limited to the embodiments set forth herein.

Figure 1:
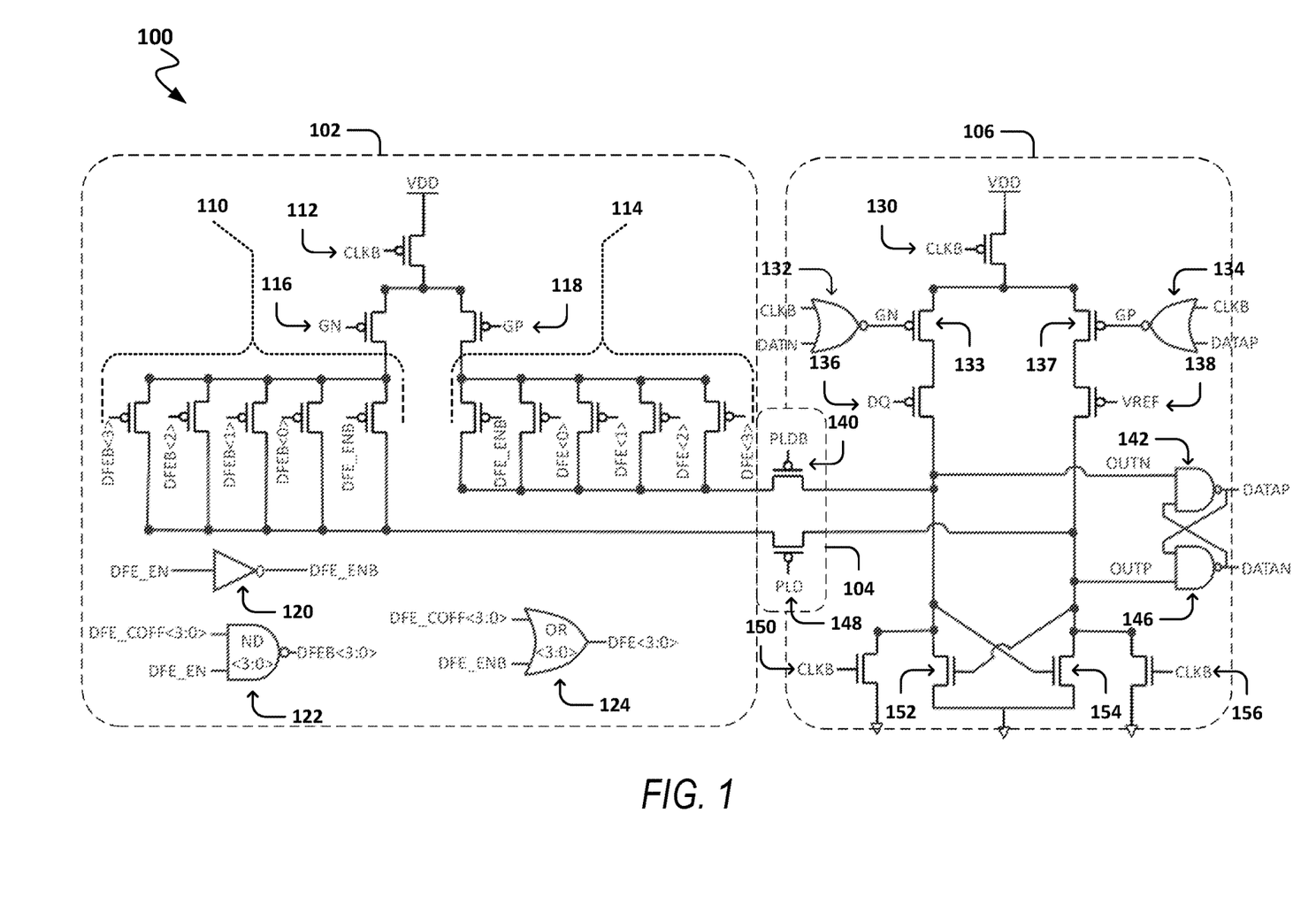
FIGS. 1 and 2 are schematics illustrating example circuits for data sampling with DFE and offset cancellation, in accordance with various embodiments.
Figure 2:
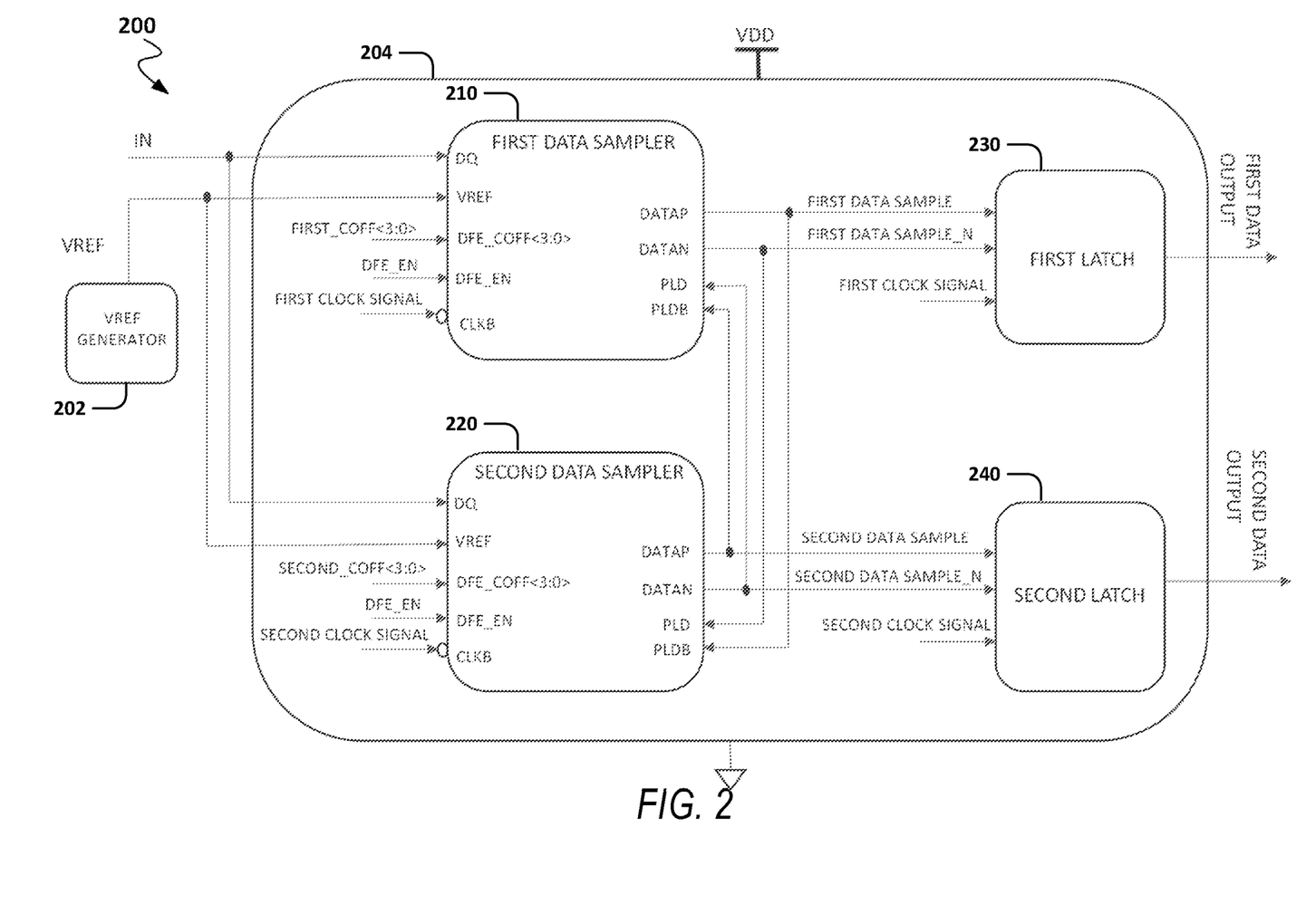

FIGS. 1 and 2 are schematics illustrating example circuits for data sampling with DFE and offset cancellation, in accordance with various embodiments. Referring now to FIG. 1, a circuit 100 is illustrated, which can represent at least a portion of an example data sampler with built-in features for DFE and offset cancellation, in accordance with various embodiments. In particular, the circuit 100 represents an example implementation of a data sampler that samples an input signal (DQ), that outputs a sample of the input signal (DQ) via a negative data output (DATAN) and a positive data output (DATAP), and that enables one-tap rolled DFE and cancellation of an offset within the data sampler. The circuit 100 as shown comprises a first portion 102, a second portion 104, a third portion 106 of the circuit 100, where the first portion 102 is configured to apply of a tap coefficient, the second portion 104 is configured to control application of the tap coefficient, and the third portion 106 that comprises at least three latches for sampling the input signal (DQ) based on a clock signal (represented by clock signal B (CLKB)) and outputting the sample via the negative data output (DATAN) and the positive data output (DATAP).

The first portion 102 comprises a transistor 112, a transistor 116, a transistor 118, a plurality of transistors 110, and a plurality of transistors 114. The first portion 102 further comprises a NOT gate 120, a NAND gate 122, and a NOR gate 124. The transistor 112 is powered by a voltage source (VDD) and is configured to receive a clock signal B (CLKB). The transistor 116 is coupled to the transistor 112 and is configured to receive a negative signal (GN). The transistor 118 is coupled to the transistor 112 and is configured to receive a positive signal (GP). The negative signal is generated by a NOR gate 132 based on the clock signal B and the negative data output (DATAN) of the input signal (DQ) as sampled, and the positive signal is generated by a NOR gate 134 based on the clock signal B and the positive data output (DATAP) of the input signal (DQ) as sampled.

The positive data signal represents an original version of an input signal to the data sampler, and the negative data signal represents an inverted version of the input signal to the data sampler. The plurality of transistors 110 is coupled to the transistor 116, and the plurality of transistors 114 is coupled to the transistor 118. The combination of the NOT gate 120, the NAND gate 122, and the NOR gate 124 is configured to enable DFE and to receive a coefficient (e.g., DFE coefficient or tap coefficient) value for a DFE tap, which is to be applied by the data sampler when DFE is enabled (e.g., by DFE_EN signal) in the data sampler. In FIG. 1, the coefficient value is provided by DFE_COFF<3:0>, which is a four-bit input representing the coefficient value.

The second portion 104 couples together the first portion 102 to the third portion 106. The second portion 104 comprises a transistor 140 coupled to the plurality of transistors 114 and configured to receive a signal PLDB. The second portion 104 further comprises a transistor 148 coupled to the plurality of transistors 110 and configured to receive a signal PLD. For various embodiments, the signal PLD represents a decision feedback signal (e.g., previous logic decision signal) for the DFE implemented by the data sampler, and the signal PLDB represents an inverted version of the signal PLD. Additionally, for some embodiments, the signal PLD and the signal PLDB are received from an output of another data sampler (e.g., of a receiver, such as 230 in FIG. 2), which with the current data sampler of the circuit 100 can implement a one-tap rolled DFE within a receiver. In FIG. 1, the output of the transistor 140 is represented as a signal OUTN, and the output of the transistor 148 is represented as a signal OUTP.

The third portion 106 comprises transistors 130, 133, 136, 137, 138, 150, 152, 154 and 156. The transistor 130 is powered by the voltage source (VDD) and is configured to receive the clock signal B. The transistor 133 is coupled to the transistor 130 and is configured to receive the negative signal (GN) generated by the NOR gate 132. The transistor 137 is coupled to the transistor 130 and is configured to receive the positive signal (GP) generated by the NOR gate 134. The transistor 136 is coupled between the transistor 133 and the output (OUTN) of the transistor 140, and is configured to receive the input signal (DQ) to be sampled by the data sampler. The transistor 138 is coupled between the transistor 137 and the output (OUTP) of the transistor 148, and is configured to receive a reference voltage (VREF) for sampling the input signal (DQ). The transistor 150 is coupled between the output (OUTN) and ground, and is configured to receive the clock signal B. The transistor 152 is coupled between the output (OUTN) and ground, and is configured to receive a signal from the output (OUTP) of the transistor 148. The transistor 156 is coupled between the output (OUTP) and ground, and is configured to receive the clock signal B. The transistor 154 is coupled between the output (OUTP) and ground, and is configured to receive a signal from the output (OUTN) of the transistor 140.

The third portion 106 further comprises a NAND gate 142 and a NAND gate 146, which is used to generate an output of the sample via the positive data output (DATAP) and the negative data output (DATAN). As shown, the NAND gate 142 receives a signal from the output (OUTN) and a signal from the negative data output (DATAN), and generates a signal output for the positive data output (DATAP). The NAND gate 146 receives a signal from the output (OUTP) and a signal from the positive data output (DATAP), and generates a signal output for the negative data output (DATAN).

Referring now to FIG. 2, a circuit 200 is illustrated, which can represent at least a portion of an example receiver that uses data sampling with DFE and offset cancellation, in accordance with various embodiments. In particular, the circuit 200 illustrates implementation of a one-tap rolled DFE and offset cancellation within the example receiver, which can enable per bit DFE training, per bit offset cancellation, or both, within the example receiver. As shown, the circuit 200 comprises a voltage reference (VREF) generator 202, and a receiver 204, which comprises a first data sampler 210, a second data sampler 220, a first latch 230, and a second latch 240. For some embodiments, each of the first data sampler 210 and the second data sampler 220 is configured to sample an input signal. For some embodiments, each of the first data sampler 210 and the second data sampler 220 is configured to apply DFE (e.g., one-tap rolled DFE), to cancel an offset (of the data sampler) within the data sampler, or both. Additionally, for some embodiments, each of the first data sampler 210 and the second data sampler 220 comprises at least three latches to implement its functionality. According to some embodiments, each of the first data sampler 210 and the second data sampler 220 is implemented, at least in part, by the circuit 100 of FIG. 1.

As shown, an input signal is received by the receiver 204, which can represent a transmitted data signal that is received by the receiver 204. The VREF generator 202 generates a reference voltage (VREF), which is received by the receiver 204. Each of the first data sampler 210 and the second data sampler 220 receive the input signal (at input DQ) and the reference voltage (at input VREF). Additionally, each of the first data sampler 210 and the second data sampler 220 receive a DFE enable signal (DFE_EN), which controls whether DFE is enabled or disabled within the first data sampler 210 and the second data sampler 220. The first data sampler 210 is configured to receive the input signal at DQ and sample the input signal, based on a first clock signal, and the second data sampler 220 is configured to receive the input signal at DQ and sample the input signal, based on a second clock signal.

Where the DFE enable signal causes DFE to be enabled on the first data sampler 210, the first data sampler 210 is configured to apply a first tap coefficient, based on a tap feedback signal received by a previous logic decision (PLD) input and an inverse previous logic decision (PLDB) input of the first data sampler 210, where the first tap coefficient is specified by FIRST_COFF<3:0> received at a four-bit DFE coefficient input (DFE_COFF<3:0>) of the first data sampler 210. In particular, the previous logic decision (PLD) input of the first data sampler 210 is coupled to a negative data output (DATAN) of the second data sampler 220, and the inverted previous logic decision (PLDB) input of the first data sampler 210 is coupled to a positive data output (DATAP) of the second data sampler 220. In this way, the first data sampler 210 can apply decision feedback equalization internally within the first data sampler 210. According to various embodiments, the first tap coefficient is applied to the input signal (received via the DQ input of the first data sampler 210) prior to the input signal being sampled by the first data sampler 210. The first tap coefficient can be determined for the first data sampler 210 during a DFE training process of the first data sampler 210, which can occur when a DFE training process invoked for all of the receiver 204. Additionally, the application of the first tap coefficient can cause cancellation of an offset present in the first data sampler 210. Accordingly, the first tap coefficient can be determined (e.g., during the DFE training process) such that the first tap coefficient simultaneously applies decision feedback equalization and offset cancellation to generate the sample of the input signal. The first data sampler 210 outputs a sample (as a first sample) of the input signal via a positive data output (DATAP) and outputs an inverted version of the sample of the input signal via a negative data output (DATAN).

Where the DFE enable signal causes DFE to be enabled on the second data sampler 220, the second data sampler 220 is configured to apply a second tap coefficient based on a tap feedback signal received by a previous logic decision (PLD) input and an inverse previous logic decision (PLDB) input of the second data sampler 220, where the second tap coefficient is specified by SECOND_COFF<3:0> received at a four-bit DFE coefficient input (DFE_COFF<3:0>) of the second data sampler 220. In particular, the previous logic decision (PLD) input of the second data sampler 220 is coupled to a negative data output (DATAN) of the first data sampler 210, and the inverted previous logic decision (PLDB) input of the second data sampler 220 is coupled to a positive data output (DATAP) of the first data sampler 210. In this way, the second data sampler 220 can apply decision feedback equalization internally within the second data sampler 220, and do so separately from the first data sampler 210. According to various embodiments, the second tap coefficient is applied to the input signal (received via the DQ input of the second data sampler 220) prior to the input signal being sampled by the second data sampler 220. The second tap coefficient can be determined for the second data sampler 220 during a DFE training process of the second data sampler 220, which can occur when a DFE training process is invoked for all of the receiver 204. Additionally, the application of the second tap coefficient can cause cancellation of an offset present in the second data sampler 220. Accordingly, the second tap coefficient can be determined (e.g., during the DFE training process) such that the second tap coefficient simultaneously applies decision feedback equalization and offset cancellation to generate the sample of the input signal. The second data sampler 220 outputs a sample (as a second sample) of the input signal via a positive data output (DATAP) and outputs an inverted version of the sample of the input signal via a negative data output (DATAN).

For various embodiments, the first and the second clock signals are complimentary (e.g., full data rate complimentary). For instance, the second clock signal can have a 180° phase difference relative to the first clock signal (e.g., the first clock signal is CLK0 and the second clock signal is CLK180). The first and the second clock signals can have a transition that is aligned with a center of the input signal.

Based on the first clock signal, the first latch 230 is configured to latch the first sample provided by the first data sampler 210 via the positive data output (DATAP) and the negative data output (DATAN). The latched first sample is output by the first data sampler 210 as first data output (e.g., a first sample data output). Based on the second clock signal, the second latch 240 is configured to latch the second sample provided by the second data sampler 220 via the positive data output (DATAP) and the negative data output (DATAN). The latched second sample is output by the second data sampler 220 as second data output (e.g., a second sample data output).

Figure 3:
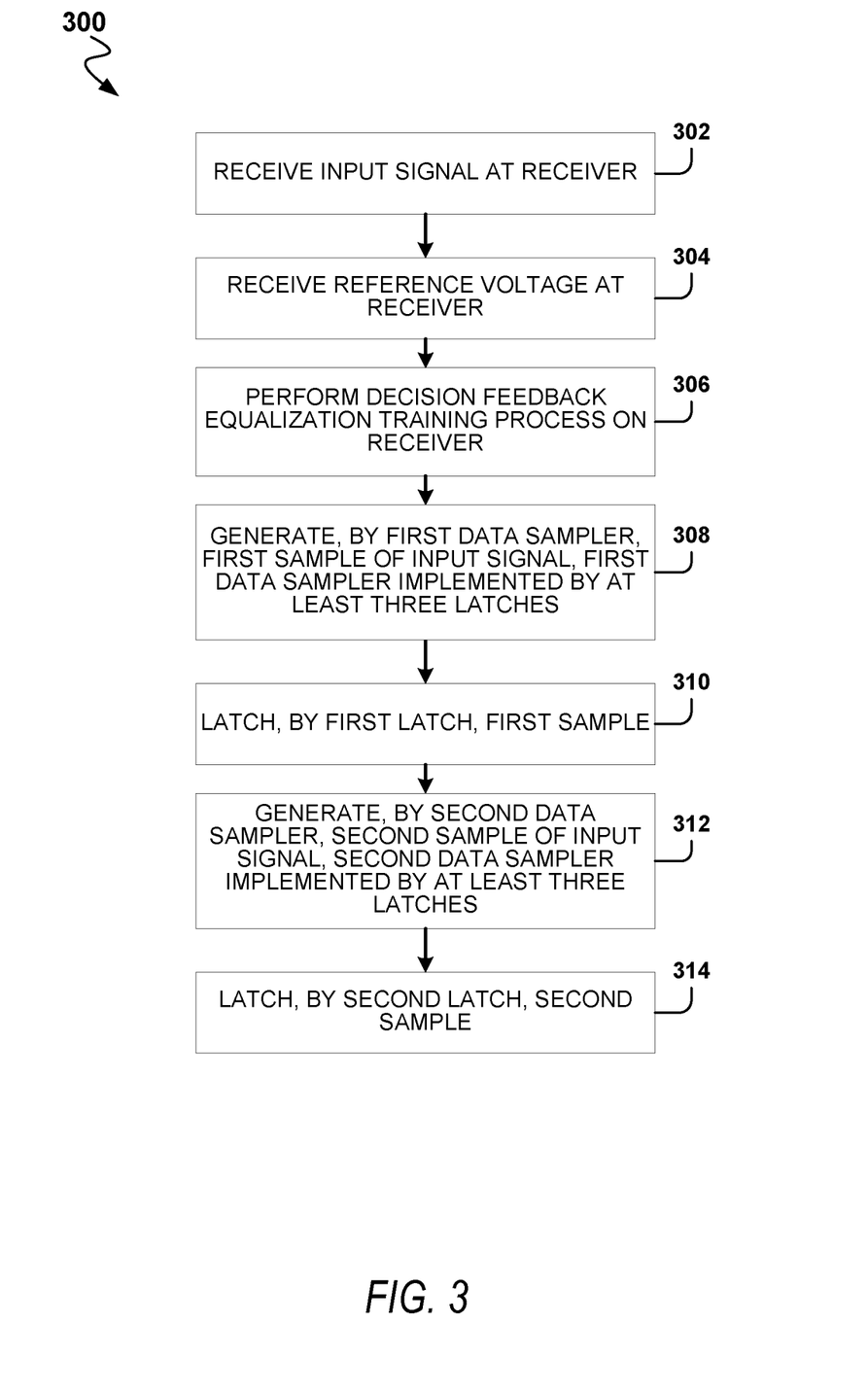
FIG. 3 is a flowchart illustrating an example method for data sampling with decision feedback equalization (DFE) and offset cancellation, in accordance with various embodiments.

FIG. 3 is a flowchart illustrating an example method 300 for data sampling with decision feedback equalization (DFE) and offset cancellation, in accordance with various embodiments. Some or all of the method 300 can be performed by a circuit, such as one or more of the circuits/components described herein with respect to FIGS. 1 and 2. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Further, for some embodiments, a method described herein may have more or fewer operations than otherwise depicted.

At operation 302, an input signal is received at a receiver circuit (e.g., 204). Additionally, at operation 304, a reference voltage is received at a receiver circuit (e.g., 204). Thereafter, at operation 306, the receiver circuit performs a decision feedback equalization (DFE) training process on the receiver circuit, where the decision feedback equalization training process can determine a first tap coefficient for a first data sampler (e.g., 210) of the receiver circuit, a second tap coefficient for a second data sampler (e.g., 220) of the receiver circuit, or both.

During operation 308, the first data sampler (e.g., 210) of the receiver circuit generates a first sample of the input signal received at operation 302. According to various embodiments, the first data sampler is configured to sample the input signal based on a first clock signal and apply the first tap coefficient based on a first-tap feedback signal. For various embodiments, the first data sampler is implemented by a first plurality of at least three latches. Subsequently, at operation 310, a first latch (e.g., 230) of the receiver circuit latches the first sample (provided by the first data sampler) based on the first clock signal, where the first latch provides (e.g., outputs) the latched first sample as a first data sample output.

Similarly, during operation 312, the second data sampler (e.g., 220) of the receiver circuit generates a second sample of the input signal received at operation 302. According to various embodiments, the second data sampler is configured to sample the input signal based on a second clock signal and apply the second tap coefficient based on a second-tap feedback signal. For various embodiments, the second data sampler is implemented by a second plurality of at least three latches. Subsequently, at operation 314, a second latch (e.g., 240) of the receiver circuit latches the second sample (provided by the second data sampler) based on the second clock signal, where the second latch provides (e.g., outputs) the latched second sample as a second data sample output.

In various embodiments, the first-tap feedback signal received by the first data sampler (e.g., 210) comprises the second sample provided by the second data sampler (e.g., 220), and the second-tap feedback signal received by the second data sampler (e.g., 220) comprises the first sample provided by the first data sampler (e.g., 210). In this way, the second data sampler output can serve as a previous logic decision for the first data sampler, and the first data sampler output can serve as a previous logic decision for the second data sampler.

Figure 4:
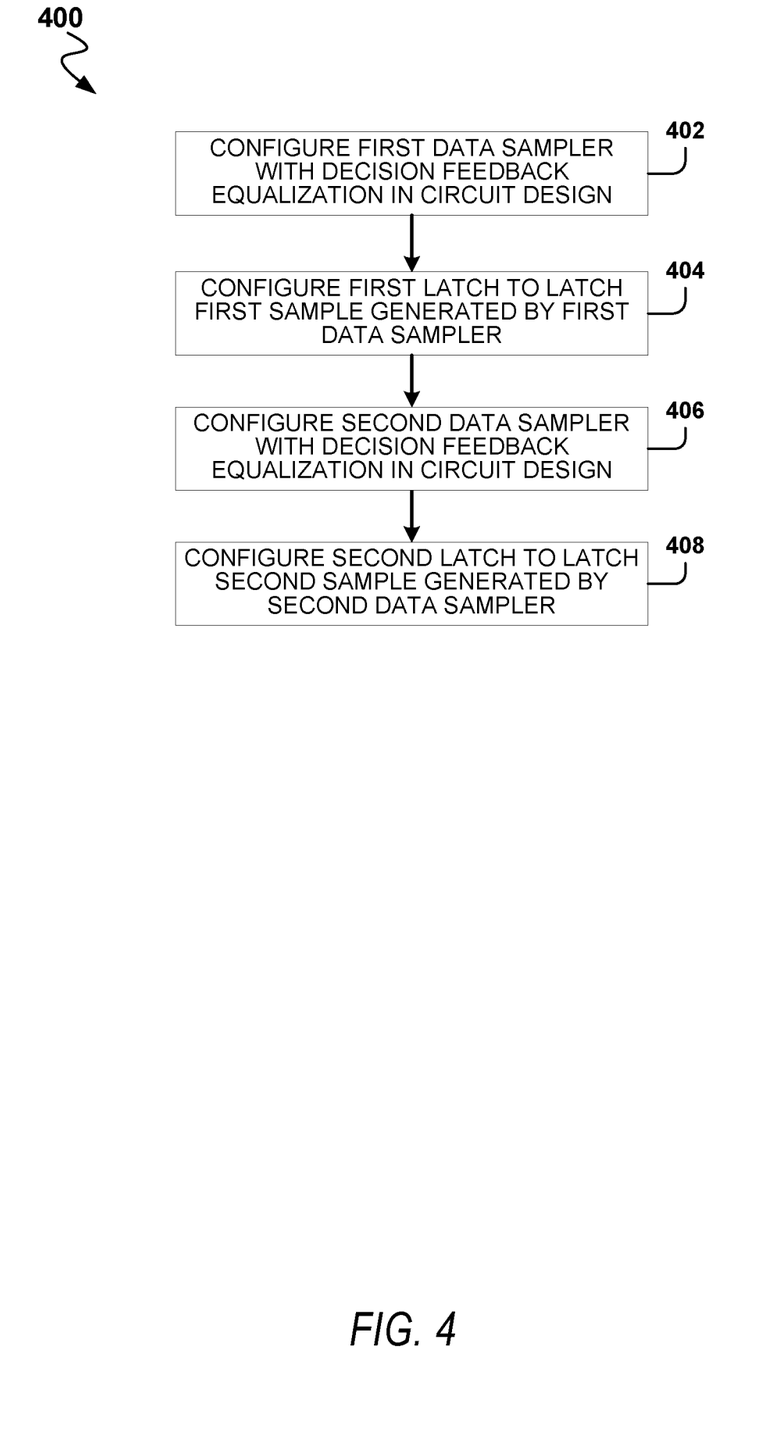
FIG. 4 is a flowchart illustrating an example method for generating a circuit design that implements a receiver, using data samplers with decision feedback equalization (DFE) and offset cancellation, in accordance with some embodiments.

FIG. 4 is a flowchart illustrating an example method 400 for generating a circuit design that implements a receiver using data samplers with decision feedback equalization (DFE) and offset cancellation, in accordance with some embodiments. It will be understood that the method 400 can be performed by a device, such as a computing device executing instructions of an EDA software system, in accordance with some embodiments. Additionally, the method 400 herein can be implemented in the form of executable instructions stored on a computer-readable medium or in the form of electronic circuitry. For instance, the operations of the method 400 may be represented by executable instructions that, when executed by a processor of a computing device, cause the computing device to perform the method 400. Depending on the embodiment, an operation of an example method described herein may be repeated in different ways or involve intervening operations not shown. Though the operations of example methods may be depicted and described in a certain order, the order in which the operations are performed may vary among embodiments, including performing certain operations in parallel. Further, for some embodiments, a method described herein may have more or fewer operations than otherwise depicted.

Depending on the embodiment, the method 400 can implement, within a circuit design, one of the circuits described herein with respect to FIGS. 1 and 2.

At operation 402, a first data sampler (e.g., 210) is configured in a circuit design. According to various embodiments, the first data sampler is configured to generate a first sample of the input signal by sampling the input signal based on a first clock signal and applying a first tap coefficient based on a first-tap feedback signal. For various embodiments, the first data sampler is implemented by a first plurality of at least three latches.

For operation 404, a first latch (e.g., 230) is configured in the circuit design. According to various embodiments, the first latch is configured to latch the first sample based on the first clock signal and provide the latched first sample as first data sample output.

During operation 406, a second data sampler (e.g., 220) is configured in the circuit design. According to various embodiments, the second data sampler is configured to generate a second sample of the input signal by sampling the input signal based on a second clock signal and applying a second tap coefficient based on a second-tap feedback signal. For various embodiments, the second data sampler is implemented by a second plurality of at least three latches. For some embodiments, the first-tap feedback signal comprises the second sample, and the second-tap feedback signal comprises the first sample.

At operation 408, a second latch (e.g., 240) is configured in the circuit design. According to various embodiments, the second latch is configured to latch the second sample based on the second clock signal and provide the latched second sample as second data sample output.

Figure 5:
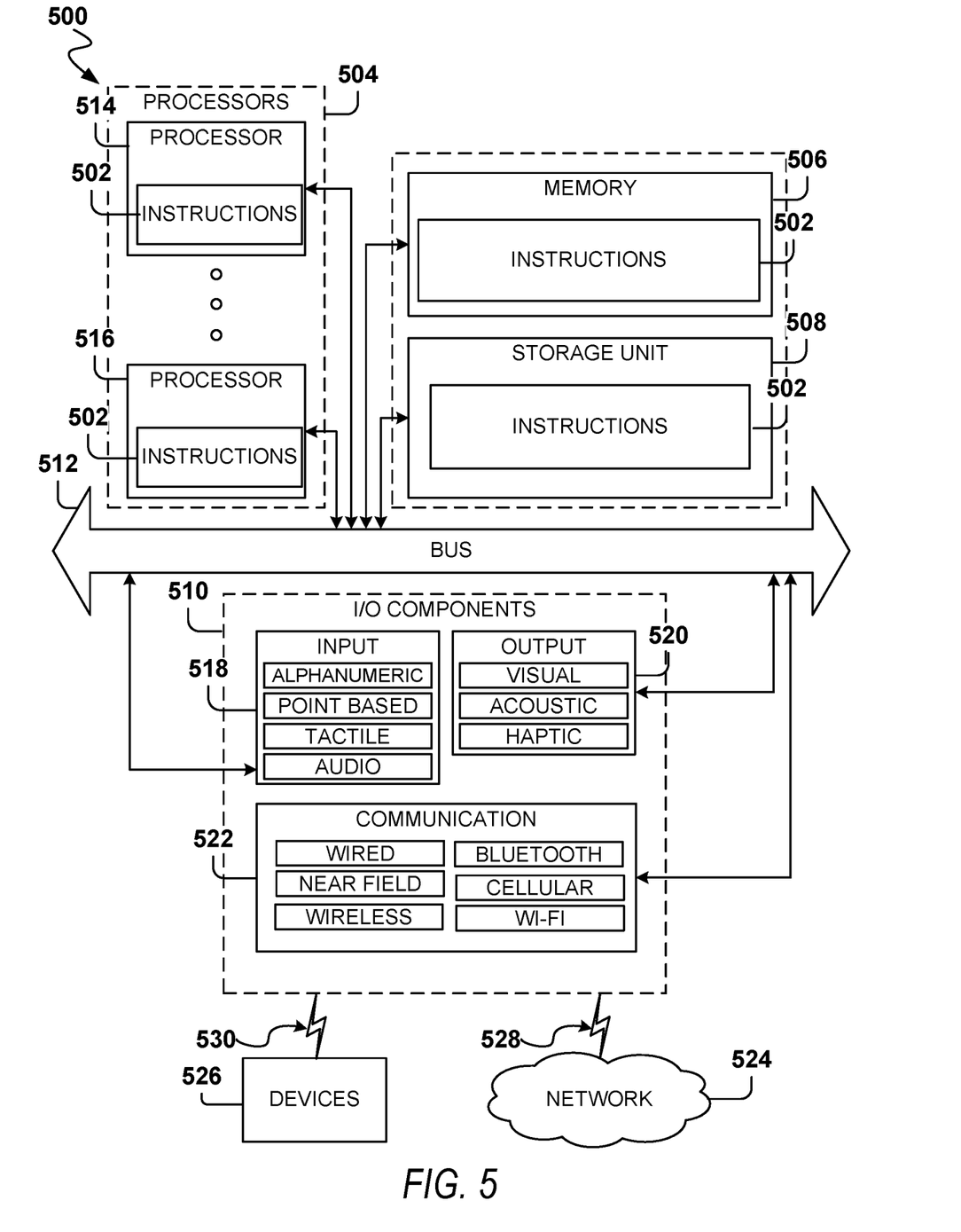
FIG. 5 is a block diagram illustrating components of a machine, according to some example embodiments, able to read instructions from a machine-readable medium and perform any one or more of the methodologies discussed herein.

FIG. 5 is a block diagram illustrating components of a machine 500, according to some example embodiments, able to read instructions from a machine-readable medium (e.g., a machine-readable storage medium) and perform any one or more of the methodologies discussed herein. Specifically, FIG. 5 shows a diagrammatic representation of the machine 500 in the example form of a system within which instructions 502 (e.g., software, a program, an application, an applet, an app, a driver, or other executable code) for causing the machine 500 to perform any one or more of the methodologies discussed herein may be executed. For example, the instructions 502 include executable code that causes the machine 500 to execute the method 400 described with respect to FIG. 4. In this way, these instructions 502 transform the general, non-programmed machine 500 into a particular machine programmed to carry out the described and illustrated method 400 in the manner described herein. The machine 500 may operate as a standalone device or may be coupled (e.g., networked) to other machines.

By way of non-limiting example, the machine 500 may comprise or correspond to a television, a computer (e.g., a server computer, a client computer, a personal computer (PC), a tablet computer, a laptop computer, or a netbook), a personal digital assistant (PDA), a smart phone, a mobile device, or any machine capable of executing the instructions 502, sequentially or otherwise, that specify actions to be taken by the machine 500. Further, while only a single machine 500 is illustrated, the term "machine" shall also be taken to include a collection of machines 500 that individually or jointly execute the instructions 502 to perform any one or more of the methodologies discussed herein.

The machine 500 may include processors 504, memory 506, a storage unit 508, and I/O components 510, which may be configured to communicate with each other such as via a bus 512. In an example embodiment, the processors 504 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) may include, for example, a processor 514 and a processor 516 that may execute the instructions 502. The term "processor" is intended to include multi-core processors 504 that may comprise two or more independent processors (sometimes referred to as "cores") that may execute instructions 502 contemporaneously. Although FIG. 5 shows multiple processors 504, the machine 500 may include a single processor with a single core, a single processor with multiple cores (e.g., a multi-core processor), multiple processors with a single core, multiple processors with multiple cores, or any combination thereof.

The memory 506 (e.g., a main memory or other memory storage) and the storage unit 508 are both accessible to the processors 504 such as via the bus 512. The memory 506 and the storage unit 508 store the instructions 502 embodying any one or more of the methodologies or functions described herein. The instructions 502 may also reside, completely or partially, within the memory 506, within the storage unit 508, within at least one of the processors 504 (e.g., within the processor's cache memory), or any suitable combination thereof, during execution thereof by the machine 500. Accordingly, the memory 506, the storage unit 508, and the memory of the processors 504 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EEPROM)), and/or any suitable combination thereof. The term "machine-readable medium" should be taken to include a single medium or multiple media (e.g., a centralized or distributed database, or associated caches and servers) able to store the instructions 502. The term "machine-readable medium" shall also be taken to include any medium, or combination of multiple media, that is capable of storing instructions (e.g., instructions 502) for execution by a machine (e.g., machine 500), such that the instructions, when executed by one or more processors of the machine (e.g., processors 504), cause the machine to perform any one or more of the methodologies described herein (e.g., method 400). Accordingly, a "machine-readable medium" refers to a single storage apparatus or device, as well as "cloud-based" storage systems or storage networks that include multiple storage apparatus or devices. T he term "machine-readable medium" excludes signals per se.

Furthermore, the "machine-readable medium" is non-transitory in that it does not embody a propagating signal. However, labeling the tangible machine-readable medium as "non-transitory" should not be construed to mean that the medium is incapable of movement—the medium should be considered as being transportable from one real-world location to another. Additionally, since the machine-readable medium is tangible, the medium may be considered to be a machine-readable device.

The I/O components 510 may include a wide variety of components to receive input, provide output, produce output, transmit information, exchange information, capture measurements, and so on. The specific I/O components 510 that are included in a particular machine 500 will depend on the type of the machine 500. For example, portable machines such as mobile phones will likely include a touch input device or other such input mechanisms, while a headless server machine will likely not include such a touch input device. It will be appreciated that the I/O components 510 may include many other components that are not specifically shown in FIG. 5. The I/O components 510 are grouped according to functionality merely for simplifying the following discussion and the grouping is in no way limiting. In various example embodiments, the I/O components 510 may include input components 518 and output components 520. The input components 518 may include alphanumeric input components (e.g., a keyboard, a touch screen configured to receive alphanumeric input, a photooptical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components, and the like. The output components 520 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth.

Communication may be implemented using a wide variety of technologies. The I/O components 510 may include communication components 522 operable to couple the machine 500 to a network 524 or devices 526 via a coupling 528 and a coupling 530 respectively. For example, the communication components 522 may include a network interface component or another suitable device to interface with the network 524. In further examples, the communication components 522 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 526 may be another machine or any of a wide variety of peripheral devices.

MODULES, COMPONENTS AND LOGIC

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field-programmable gate array (FPGA) or an ASIC) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time, and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor implemented. For example, at least some of the operations of a method may be performed by one or more processors or processor implemented modules. The performance of certain of the operations may be distributed among the one or more processors, not only residing within a single machine, but deployed across a number of machines. In some example embodiments, the processor or processors may be located in a single location (e.g., within a home environment, an office environment, or a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., APIs).

ELECTRONIC APPARATUS AND SYSTEM

Embodiments may be implemented in digital electronic circuitry, in computer hardware, firmware, or software, or in combinations of them. Embodiments may be implemented using a computer program product, for example, a computer program tangibly embodied in an information carrier, for example, in a machine-readable medium for execution by, or to control the operation of, data processing apparatus, for example, a programmable processor, a computer, or multiple computers.

A computer program can be written in any form of programming language, including compiled or interpreted languages, and it can be deployed in any form, including as a standalone program or as a module, subroutine, or other unit suitable for use in a computing environment. A computer program can be deployed to be executed on one computer or on multiple computers at one site, or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., an FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or in a combination of permanently and temporarily configured hardware may be a design choice.

Figure 6:
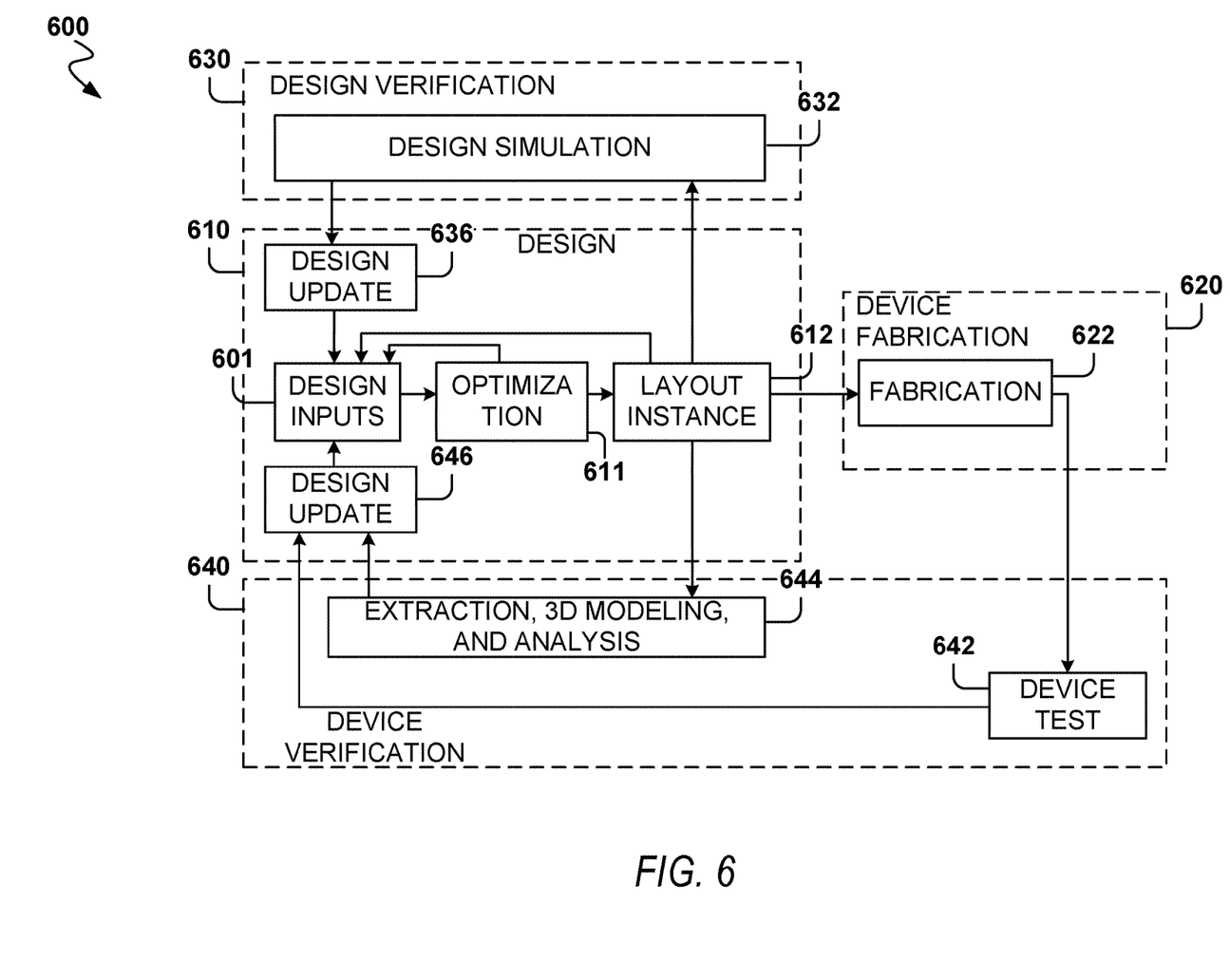
FIG. 6 is a diagram illustrating one possible design process flow for generating a circuit, including embodiments to implement a data sampling with decision feedback equalization (DFE) and offset cancellation as described herein, and in various embodiments, to integrate the circuit with a larger circuit.

FIG. 6 is a diagram illustrating one possible design process flow for generating a circuit, including embodiments to implement a data sampling with decision feedback equalization (DFE) and offset cancellation as described herein, and in various embodiments, to integrate the circuit with a larger circuit. As illustrated, the overall design flow 600 includes a design phase 610, a device fabrication phase 620, a design verification phase 630, and a device verification phase 640. The design phase 610 involves an initial design input operation 601 where the basic elements and functionality of a device are determined, as well as revisions based on various analyses and optimization of a circuit design. This design input operation 601 is where instances of an EDA circuit design file are used in the design and any additional circuitry is selected. The initial strategy, tactics, and context for the device to be created are also generated in the design input operation 601, depending on the particular design algorithm to be used.

In some embodiments, following an initial selection of design values in the design input operation 601, timing analysis and optimization according to various embodiments occurs in an optimization operation 611, along with any other automated design processes. As described below, design constraints for blocks of a circuit design generated with design inputs in the design input operation 601 may be analyzed using hierarchical timing analysis, according to various embodiments. While the design flow 600 shows such optimization occurring prior to a layout instance 612, such hierarchical timing analysis and optimization may be performed at any time to verify operation of a circuit design. For example, in various embodiments, constraints for blocks in a circuit design may be generated prior to routing of connections in the circuit design, after routing, during register transfer level (RTL) operations, or as part of a final signoff optimization or verification prior to a device fabrication operation 622.

After design inputs are used in the design input operation 601 to generate a circuit layout, and any optimization operations 611 are performed, a layout is generated in the layout instance 612. The layout describes the physical layout dimensions of the device that match the design inputs. This layout may then be used in the device fabrication operation 622 to generate a device, or additional testing and design updates may be performed using designer inputs or automated updates based on design simulation 632 operations or extraction, 3D modeling, and analysis 644 operations. Once the device is generated, the device can be tested as part of device test 642 operations, and layout modifications generated based on actual device performance.

As described in more detail below, design updates 636 from the design simulation 632, design updates 646 from the device test 642, the extraction, 3D modeling, and analysis 644 operations, or the design input operation 601 may occur after an initial layout instance 612 is generated. In various embodiments, whenever design inputs are used to update or change an aspect of a circuit design, a timing analysis and optimization operation 611 may be performed.

For example, in various embodiments, a user may provide an input to a computing device indicating placement of elements of a circuit within a portion of a circuit design, including description of circuitry for a multi-channel memory interface described herein. An output to a display of the computing device may show details of a circuit design, and may further be used to generate results of the timing analysis, or may show recommended optimizations or automatically performed adjustments to the circuit design based on the timing analysis. Further inputs to the computing device may involve adjustments as user design inputs, with additional timing analysis and optimization initiated via user operation of the computing device. In some embodiments, a computing device may be used to generate circuit design files describing circuitry corresponding to embodiments described herein. Such circuit design files may be used as outputs to generate photolithographic masks or other control files and components used to generate circuits that operate in accordance with various embodiments described herein.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The detailed description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. The terms "a" or "an" should be read as meaning "at least one," "one or more," or the like. The use of words and phrases such as "one or more," "at least," "but not limited to," or other like phrases shall not be read to mean that the narrower case is intended or required in instances where such broadening phrases may be absent.

Boundaries between various resources, operations, components, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

The description above includes systems, methods, devices, instructions, and computer media (e.g., computing machine program products) that embody illustrative embodiments of the disclosure. In the description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

What is claimed is:

1. A circuit comprising:
    an input for receiving an input signal;
    a first data sampler configured to generate a first sample of the input signal by sampling the input signal based on a first clock signal and applying a first tap coefficient based on a first-tap feedback signal, the first data sampler being implemented by a first plurality of latches, the first plurality of latches comprising at least three latches;
    a first latch configured to latch the first sample based on the first clock signal and provide the latched first sample as first data sample output;
    a second data sampler configured to generate a second sample of the input signal by sampling the input signal based on a second clock signal and applying a second tap coefficient based on a second-tap feedback signal, the second data sampler being implemented by a second plurality of latches, the second plurality of latches comprising at least three latches, the first-tap feedback signal comprising the second sample, the second-tap feedback signal comprising the first sample; and
    a second latch configured to latch the second sample based on the second clock signal and provide the latched second sample as second data sample output.

2. The circuit of claim 1, the first clock signal and the second clock signal are complimentary.

3. The circuit of claim 1, wherein the first data sampler internally implements one-tap decision feedback equalization, and the second data sampler internally implements one-tap decision feedback equalization.

4. The circuit of claim 1, wherein the first data sampler internally implements one-tap decision feedback equalization and offset cancellation of the first data sampler, and the second data sampler internally implements one-tap decision feedback equalization and offset cancellation of the second data sampler.

5. The circuit of claim 1, wherein the first tap coefficient is determined such that the first tap coefficient simultaneously applies decision feedback equalization and offset cancellation to generate the first sample.

6. The circuit of claim 5, wherein the second tap coefficient is determined such that the second tap coefficient simultaneously applies decision feedback equalization and offset cancellation to generate the second sample.

7. The circuit of claim 1, wherein the input signal is not pre-amplified prior to being received by the input.

8. The circuit of claim 1, wherein the input is a first input, and the circuit further comprises a second input for receiving a reference voltage, the first data sampler sampling the input signal based on the first clock signal and the reference voltage, the second data sampler sampling the input signal based on the second clock signal and the reference voltage.

9. The circuit of claim 1, wherein at least one of the first tap coefficient or the second tap coefficient is determined by performing a decision feedback equalization training process on the circuit.

10. The circuit of claim 1, wherein the first data sampler comprises:
    a first portion that implements application of the first tap coefficient;
    a second portion that controls the application of the first tap coefficient; and
    a third portion that comprises the first plurality of latches, the first plurality of latches implementing a three-latch data sampler for sampling the input signal based on the first clock signal, the second portion operatively coupling together the first portion and the third portion.

11. A method comprising:
    receiving an input signal at a receiver circuit;
    generating, by a first data sampler of the receiver circuit, a first sample of the input signal, the first data sampler being configured to sample the input signal based on a first clock signal and applying a first tap coefficient based on a first-tap feedback signal, the first data sampler being implemented by a first plurality of latches, the first plurality of latches comprising at least three latches;
    latching, by a first latch of the receiver circuit, the first sample based on the first clock signal, the first latch providing the latched first sample as first data sample output;
    generating, by a second data sampler of the receiver circuit, a second sample of the input signal, the second data sampler being configured to sample the input signal based on a second clock signal and applying a second tap coefficient based on a second-tap feedback signal, the second data sampler being implemented by a second plurality of latches, the second plurality of latches comprising at least three latches, the first-tap feedback signal comprising the second sample, the second-tap feedback signal comprising the first sample; and latching, by a second latch of the receiver circuit, the second sample based on the second clock signal, the second latch providing the latched second sample as second data sample output.

12. The method of claim 11, wherein the first clock signal and the second clock signal are complimentary.

13. The method of claim 11, wherein the first data sampler internally implements one-tap decision feedback equalization, and the second data sampler internally implements one-tap decision feedback equalization.

14. The method of claim 11, wherein the first tap coefficient is determined such that the first tap coefficient simultaneously applies decision feedback equalization and offset cancellation to generate the first sample.

15. The method of claim 14, wherein the second tap coefficient is determined such that the second tap coefficient simultaneously applies decision feedback equalization and offset cancellation to generate the second sample.

16. The method of claim 11, wherein the input signal is not pre-amplified prior to being received by the receiver circuit.

17. The method of claim 11, further comprising:
receiving a reference voltage at the receiver circuit, the first data sampler sampling the input signal based on the first clock signal and the reference voltage, the second data sampler sampling the input signal based on the second clock signal and the reference voltage.

18. The method of claim 11, further comprising:
performing a decision feedback equalization training process on the receiver circuit, the decision feedback equalization training process determining the first tap coefficient.

19. The method of claim 11, wherein the first data sampler comprises:
a first portion that implements application of the first tap coefficient;

a second portion that controls the application of the first tap coefficient; and a third portion that comprises the first plurality of latches, the first plurality of latches implementing a three-latch data sampler for sampling the input signal based on the first clock signal, the second portion operatively coupling together the first portion and the third portion.

20. A non-transitory computer-readable medium comprising instructions that, when executed by one or more processors of a computing device, cause the computing device to generate a circuit design by performing operations comprising:

configuring, in the circuit design, a first data sampler that is configured to generate a first sample of an input signal by sampling the input signal based on a first clock signal and applying a first tap coefficient based on a first-tap feedback signal, the first data sampler being implemented by a first plurality of latches, the first plurality of latches comprising at least three latches;

configuring, in the circuit design, a first latch configured to latch the first sample based on the first clock signal and provide the latched first sample as first data sample output;

configuring, in the circuit design, a second data sampler that is configured to generate a second sample of the input signal by sampling the input signal based on a second clock signal and applying a second tap coefficient based on a second-tap feedback signal, the second data sampler being implemented by a second plurality of latches, the second plurality of latches comprising at least three latches, the first-tap feedback signal comprising the second sample, the second-tap feedback signal comprising the first sample; and configuring, in the circuit design, a second latch configured to latch the second sample based on the second clock signal and provide the latched second sample as second data sample output.

* * * * *